(12) United States Patent
Grossman et al.

(10) Patent No.: US 8,567,249 B2
(45) Date of Patent: Oct. 29, 2013

(54) NANOMECHANICAL RESONANCE DETECTOR

(75) Inventors: Jeffrey C. Grossman, Berkeley, CA (US); Alexander K. Zettl, Kensington, CA (US)

(73) Assignee: The Regents of the University of California, Oakland, CA (US)

( * ) Notice: Subject to any disclaimer, the term of this patent is extended or adjusted under 35 U.S.C. 154(b) by 487 days.

(21) Appl. No.: 12/543,359

(22) Filed: Aug. 18, 2009

(65) Prior Publication Data

US 2010/0050772 A1 Mar. 4, 2010

Related U.S. Application Data

(60) Provisional application No. 61/089,848, filed on Aug. 18, 2008.

(51) Int. Cl.
*G01H 13/00* (2006.01)
(52) U.S. Cl.
USPC ............................................. 73/579; 977/902
(58) Field of Classification Search
USPC ........................................................... 73/579
See application file for complete search history.

(56) References Cited

U.S. PATENT DOCUMENTS

| 7,199,498 | B2 | 4/2007 | Pinkerton et al. |
| 7,915,973 | B2 | 3/2011 | Zettl et al. |
| 2002/0149377 | A1* | 10/2002 | Hefti et al. ................... 324/636 |
| 2007/0164271 | A1* | 7/2007 | Wait, Jr. ......................... 257/25 |

OTHER PUBLICATIONS

P. Alex Greaney and Jeffrey C. Grossman, "Nanomechanical Resonance Spectroscopy: A Novel Route to Ultrasensitive Label-Free Detection," Nano Lett., 2008, 8 (9), pp. 2648-2652.

* cited by examiner

*Primary Examiner* — Hezron E Williams
*Assistant Examiner* — Gregory J Redmann
(74) *Attorney, Agent, or Firm* — Lawrence Berkeley; National Laboratory

(57) ABSTRACT

An embodiment of a nanomechanical frequency detector includes a support structure and a plurality of elongated nanostructures coupled to the support structure. Each of the elongated nanostructures has a particular resonant frequency. The plurality of elongated nanostructures has a range of resonant frequencies. An embodiment of a method of identifying an object includes introducing the object to the nanomechanical resonance detector. A resonant response by at least one of the elongated nanostructures of the nanomechanical resonance detector indicates a vibrational mode of the object. An embodiment of a method of identifying a molecular species of the present invention includes introducing the molecular species to the nanomechanical resonance detector. A resonant response by at least one of the elongated nanostructures of the nanomechanical resonance detector indicates a vibrational mode of the molecular species.

20 Claims, 1 Drawing Sheet

NANOMECHANICAL RESONANCE DETECTOR

RELATED APPLICATIONS

This application claims priority to and the benefit of U.S. Provisional Application No. 61/089,848, filed on Aug. 18, 2008, which is hereby incorporated by reference.

STATEMENT OF GOVERNMENT SUPPORT

This invention was made with government support under Contract No. DE-AC02-05CH11231 awarded by the U.S. Department of Energy and under NSF Grant No. EEC-0425914. The government has certain rights in this invention.

BACKGROUND OF THE INVENTION

The present invention relates to the field of nanosensor technology.

There are many challenges associated with the development of novel sensors that rely on nanoscale phenomena and materials. Different nanosensor technologies show promise—optical properties of quantum dots, electrical properties of nanotubes, or mechanical properties of cantilevers—and numerous hurdles specific to each must be overcome involving optimal design, manufacturability, nano/micro integration, and robustness. However, one fundamental obstacle is prominent for all major nanoscale sensing technologies: how to chemically functionalize the sensor to detect only the specific object of interest and nothing else. It can take years to find the right chemical linker or surface modification that will attach a desired molecule with a given specificity, and in some cases, it may not even be possible.

Currently, chemical functionalization techniques are used to specify what the desired nano (or micro) detector is to sense. For example, for biological molecules, this might mean developing an antibody/antigen (i.e., lock-key) pair, or an alternative synthetically generated ligand.

SUMMARY OF THE INVENTION

Embodiments of the present invention include a nanomechanical resonance detector, a method of identifying an object, and a method identifying a molecular species. According to an embodiment, a nanomechanical resonance detector of the present invention includes a support structure and a plurality of elongated nanostructures coupled to the support structure. Each of the elongated nanostructures has a particular resonant frequency. The plurality of elongated nanostructures has a range of resonant frequencies. In an embodiment, at least some of the elongated nanostructures are suspended across a trench of the support structure. According to such an embodiment, a width of the trench at each elongated nanostructure that is suspended across the trench may determine the particular resonant frequency. The elongated nanostructures may be selected from nanotubes (e.g., carbon nanotubes), nanowires, or some other suitable elongated nanostructures.

According to an embodiment, a method of identifying an object of the present invention includes introducing the object to the nanomechanical resonance detector. A resonant response by at least one of the elongated nanostructures of the nanomechanical resonance detector indicates a vibrational mode of the object. According to embodiments, the object may a molecule, a compound, a protein, a nanostructure, or some other suitable object that has one or more vibrational modes.

According to an embodiment, a method of identifying a molecular species of the present invention includes introducing the molecular species to the nanomechanical resonance detector. A resonant response by at least one of the elongated nanostructures of the nanomechanical resonance detector indicates a vibrational mode of the molecular species. In an embodiment, the molecular species that is introduced to the nanomechanical frequency detector is a known molecular species. According to such an embodiment, the method may further include forming a database record that includes the resonant response and a name of the molecular species. In another embodiment, the molecular species may be an unknown molecular species. According to such an embodiment, the method may further include querying a database with the resonant response and receiving a name of the molecular species in return. According to an embodiment, multiple molecular species may be introduced to the nanomechanical resonance detector at about the same time. According to such an embodiment, multiple resonant responses may be detected that identify the multiple molecular species.

BRIEF DESCRIPTION OF THE DRAWINGS

The foregoing aspects and others will be readily appreciated by the skilled artisan from the following description of illustrative embodiments when read in conjunction with the accompanying drawings.

DETAILED DESCRIPTION OF THE INVENTION

Figure 1:
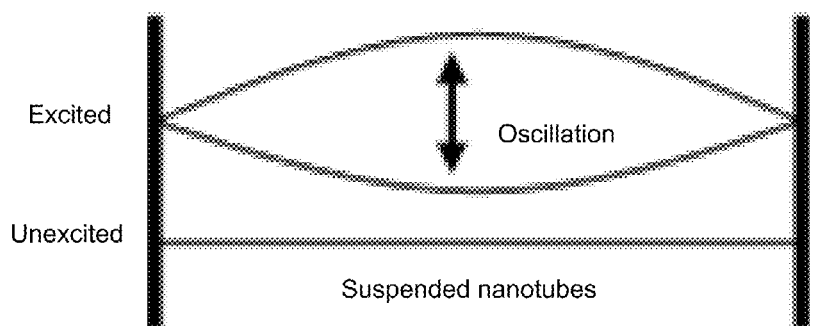
FIG. 1 illustrates an elongated nanostructure, such as a nanotube or nanowire, when its fundamental mode of oscillation is unexcited (bottom) or excited (top).

Before the present invention is described, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are now described. All publications mentioned herein are incorporated herein by reference to disclose and describe the methods and/or materials in connection with which the publications are cited.

It must be noted that as used herein and in the appended claims, the singular forms "a", "and", and "the" include plural referents unless the context clearly dictates otherwise. Thus, for example, reference to "a nanotube" includes a plurality of such nanotubes, and so forth.

In this specification and in the claims that follow, reference will be made to a number of terms that shall be defined to have the following meanings:

The term "elongated nanostructure" refers to a solid, cylindrically shaped, and discrete fibril typically characterized by a substantially constant diameter. In some embodiments, the substantially constant diameter is about 1 nm to about 100 nm. In particular embodiments, the substantially constant diameter is about 2 nm to about 50 nm. In addition, the elongated nanostructure typically exhibits a length greater than about 10 times the diameter, preferably greater than about 100 times the diameter. Examples of the elongated nanostructure, include but are not limited to a nanotube and a nanowire.

In some embodiments, the device of the present invention is a "NanoPiano" in that the device can listen to the music a target of interest makes without needing to adhere the target of interest to a surface, thereby allowing for continuous measurements with no cleaning, resetting, or degradation of the sensor. The device is a nanodetection system that can detect a target of interest without a single chemistry step. The NanoPiano is possible because of the capability to synthesize nanoscale objects that resonate at the same frequencies of the natural vibrations of target of interest.

In some embodiments, the elongated nanostructures are placed across trenches and made to oscillate like the string of a guitar. Analogous to the strings in musical instruments, the frequencies of the fundamental modes of oscillation of these nanoscale beams are controllable by varying the width of the trench (and other means as well, such as chemical treatment). An illustration of this simple property is shown in FIG. 1.

In some embodiments, the device comprises a nanotube or nanowire, wherein the nanotube or nanowire comprises two ends and each end is attached to one or more support or substrate of the device, whereupon excitement the nanotube or nanowire is capable of oscillating and giving a specific fundamental frequency of vibration.

In some embodiments, the device comprises a plurality of nanotubes or nanowires, wherein each nanotube or nanowire comprises two ends and each end of each nanotube or nanowire is attached to one or more support or substrate of the device, wherein each nanotube or nanowire upon excitement is capable of oscillating and giving a specific fundamental frequency of vibration and together there is a plurality of fundamental frequency of vibrations.

Figure 2:
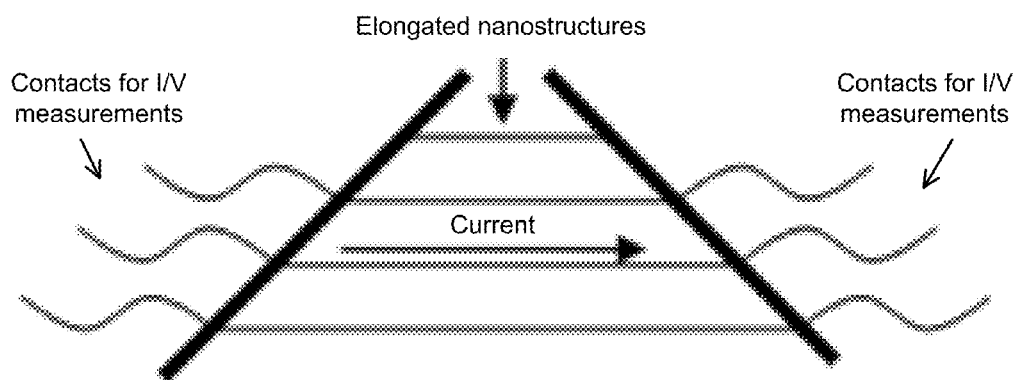
FIG. 2 shows elongated nanostructures, such as nanotubes or nanowires, shown across a trench with varying width. Each elongated nanostructure can be excited at its fundamental vibrational frequency. Measuring I/V characteristics is one way to determine if a particular mode is excited or not.

Thus, each elongated nanostructure, or nano-"string", can be thought of as a note on a piano of frequencies (right hand side of FIG. 1). By constructing a set of such elongated nanostructures, each one with varying length, one can build a full "piano" with a wide range of notes. This is illustrated in FIG. 2. One of the key aspects of this invention is the fact that the frequencies represented by such a device are in the same range as the fundamental modes of vibrations of a target of interest. This matching of frequencies is due to the particular mechanical properties of each elongated nanostructure, or nanotube or nanowire.

Figure 3:
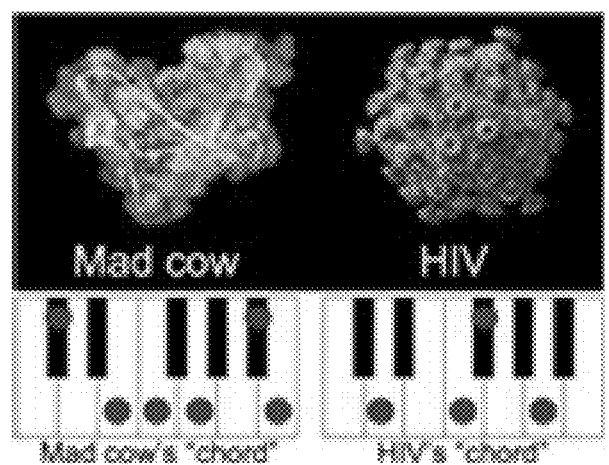
FIG. 3 shows an illustration of how, each target of interest has its own unique set of vibrational excitations which, taken together, form a unique chord on the "NanoPiano," a term coined to describe a nanomechanical resonant detector of the present invention.

The target of interest can be any structure, including but not limited to a molecule, compound, protein, or nanostructure, that has one or more vibrational mode. The nanostructure can be any biological structure, such as a virus or viral particle. A target of interest has a specific vibrational spectrum. In terms of the piano, this would correspond to a unique "chord", i.e., a set of oscillations of the target of interest that are constantly playing the same frequencies. A cartoon picture of this is shown in FIG. 3. For example if the target of interest is a Mad Cow prion particle, then the Mad Cow prion particle has a specific vibrational spectrum. For example if the target of interest is a HIV virus, then the HIV virus has a specific vibrational spectrum.

When a given target of interest comes within the vicinity of, or in contact with, of a particular elongated nanostructure, if one of the vibrational modes of the target of interest has the same frequency as the fundamental mode of that elongated nanostructure, then the two objects can be in resonance with one another. This means that a large amount of energy can be transferred very efficiently either to or from the target of interest into the elongated nanostructure. Thus, if the target of interest passes by each elongated nanostructure in the device of the present invention, those elongated nanostructure which are in resonance with one of the vibrational modes of the target of interest will be "plucked" and begin to resonate more than any other elongated nanostructure(s) in the device, which are not in resonance with any other vibrations of the target of interest. In this manner, the chord is struck on the device, and it can be read directly or detected by a number of means. One means is by I/V sweeps. One embodiment is shown in FIG. 2.

The present invention allows one skilled in the art to carry out a label-free detection. This means that a single detection system can detect many different target of interest without the need for new chemical functionalization (or labeling) of the detector.

In the practice of the present invention, a target of interest has a specific or unique set of vibrational excitations which when in proximity or contact with one or more of the elongated nanostructures of the device is capable of exciting or vibrating the one or more elongated nanostructures which are in resonance with the vibrational excitations of the target of interest. This causes the specific set of one or more elongated nanostructures to be excited or to oscillate (see FIG. 1). The specific set of elongated nanostructures excited or oscillating are detected by any suitable means. One suitable means is measuring the I/V characteristics of the elongated nanostructures, such as by performing an I/V sweep of the elongated nanostructures. In some embodiments, device of the invention further comprises contacts at the ends of the elongated nanostructures such that I/V measurements can be taken of the one or more the elongated nanostructures. In some embodiments, a contact is attached or connected to each end of each elongated nanostructure of the device, wherein the contacts allow for the I/V measurement of the elongated nanostructures.

The chemical bonds within a molecule of a target of interest give rise to high frequency oscillations between the atomic constituents in the molecule. Further, specific chemical groups of atoms have their own chemical resonant frequencies. Thus, for a target of interest, it is possible to determine or detect the specific pattern of oscillatory or vibrational frequencies that is unique to the target of interest. As such, the detection of the specific pattern of oscillatory or vibrational frequencies transferred from the target of interest to the one or more elongated nanostructures of the device makes it is possible to detect the presence of the target of interest. Such detection can be practiced without the need for a specific chemical label, and hence can be label-free. There is no need for any linking chemical bond required to detect the target of interest. Thus, "label free" detection is possible. This means that a single detection system may be used to detect many different targets of interest, such as different molecules, without the need for a new chemical functionalization (or labeling) of the detector. Since the detector is "label free", in theory continuous measurements may be made without cleaning, resetting, or degrading the sensor.

Such a type of detector system would appear to be one of the most important challenges to sensing. Since the detector system described here could detect virtually anything, it can be directly compared with other detection devices that have been modified to detect only a single molecular species. The results possible here would be obtainable much more efficiently because only one detector would be all that would be needed for all species, as opposed to a new detector for each and every species.

In some embodiments, the device is designed to comprise 4 elongated nanostructures in which each elongated nanostructure is tuned to a dominant vibrational mode of one of 4 base pairs: Adenine, Cytosine, Guanine, and Thymine or Uracil. A nucleic acid comprising an oligomer would be dragged across the device, and as such each base pair would show up as one of the 4 elongated nanostructures being excited. The nucleic acid can be DNA or RNA. In some embodiments, the nucleic acid is single stranded. Such a device is a gene sequencer, and would be useful in the fields in medicine, drug design, and/or genetics.

The device of the present invention is capable of detecting one or more targets of interest in a manner that no other current sensor is capable of. In some embodiments of the invention, the device of the present invention is capable of label-free detection. The invention can be applied in a variety of fields, including, but not limited to, chemical, biological, radiation, and acoustic sensing. Such devices can have a wide application, such as in medicine, homeland security, environmental monitoring, and clean energy and water.

These and other objects, advantages, and features of the invention will become apparent to those persons skilled in the art upon reading the details of the invention as described herein.

All publications, patents, and patent applications mentioned in this specification are herein incorporated by reference to the same extent as if each individual publication or patent application were each specifically and individually indicated to be incorporated by reference.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the present invention. All such modifications are intended to be within the scope of the claims appended hereto.

What is claimed is:

1. A nanomechanical frequency detector comprising:
   a support structure including a trench; and
   a plurality of carbon nanotubes, each of the carbon nanotubes coupled to the support structure and suspended across the trench of the support structure, each of the carbon nanotubes having a substantially constant diameter, having a length across the trench different from lengths across the trench of others of the plurality of carbon nanotubes, and having a resonant frequency, the resonant frequency of each of the carbon nanotubes being determined by the length across the trench of the carbon nanotube, the plurality of carbon nanotubes having a range of resonant frequencies.

2. The nanomechanical frequency detector of claim 1, wherein the substantially constant diameter is about 1 nanometer to about 100 nanometers.

3. The nanomechanical frequency detector of claim 1, wherein the substantially constant diameter is about 2 nanometers to about 50 nanometers.

4. The nanomechanical frequency detector of claim 1, wherein a length of each carbon nanotube is greater than about 10 times the substantially constant diameter.

5. The nanomechanical frequency detector of claim 1, wherein a length of each carbon nanotube is greater than about 100 times the substantially constant diameter.

6. A method comprising:
   introducing an object to a nanomechanical frequency detector comprising:
      a support structure including a trench; and
      a plurality of carbon nanotubes, each of the carbon nanotubes coupled to the support structure and suspended across the trench of the support structure, each of the carbon nanotubes having a substantially constant diameter, having a length across the trench different from lengths across the trench of others of the plurality of carbon nanotubes, and having a resonant frequency, the resonant frequency of each of the carbon nanotubes being determined by the length across the trench of the carbon nanotube, the plurality of carbon nanotubes having a range of resonant frequencies, wherein the object causes at least one of the plurality of carbon nanotubes to resonate; and
   measuring characteristics of each of the plurality of carbon nanotubes.

7. The method of claim 6, wherein the object is selected from a group consisting of a molecule, a compound, a protein, and a nanostructure.

8. The method of claim 6, wherein introducing the object to the nanomechanical frequency detector comprises introducing a known object to the nanomechanical frequency detector.

9. The method of claim 8, further comprising:
   forming a database record that comprises the characteristics and a name of the known object.

10. The method of claim 6, further comprising:
    querying a database, the query including the characteristics measured; and
    receiving a name of the object.

11. The method of claim 6, further comprising:
    introducing a second object to the nanomechanical frequency detector, wherein the second object causes at least a second one of the plurality of carbon nanotubes to resonate.

12. The method of claim 6, wherein the substantially constant diameter is about 1 nanometer to about 100 nanometers.

13. The method of claim 6, wherein the substantially constant diameter is about 2 nanometers to about 50 nanometers.

14. The method of claim 6, wherein a length of each carbon nanotube is greater than about 10 times the substantially constant diameter.

15. The method of claim 6, wherein a length of each carbon nanotube is greater than about 100 times the substantially constant diameter.

16. A device comprising:
a support structure including a trench; and
a plurality of nanostructures, each of the nanostructures coupled to the support structure and suspended across the trench of the support structure, having a length across the trench different from lengths across the trench of others of the plurality of nanostructures, and having a resonant frequency, the length of each nanostructure across the trench being greater than about 10 times a diameter of the nanostructure, the resonant frequency of each of the nanostructures being determined by the length across the trench of the nanostructure.

17. The device of claim 16, wherein each of the nanostructures has a substantially constant diameter.

18. The device of claim 17, wherein the substantially constant diameter is about 1 nanometer to about 100 nanometers.

19. The device of claim 17, wherein the substantially constant diameter is about 2 nanometers to about 50 nanometers.

20. The device of claim 16, wherein the plurality of elongated nanostructures is selected from a group consisting of a plurality of nanotubes, a plurality of carbon nanotubes, and a plurality of nanowires.

* * * * *